United States Patent
Li et al.

(10) Patent No.: US 10,853,820 B2
(45) Date of Patent: Dec. 1, 2020

(54) METHOD AND APPARATUS FOR RECOMMENDING TOPIC-COHESIVE AND INTERACTIVE IMPLICIT COMMUNITIES IN SOCIAL CUSTOMER RELATIONSHIP MANAGEMENT

(71) Applicant: Xerox Corporation, Norwalk, CT (US)

(72) Inventors: Lei Li, Miami, FL (US); Wei Peng, Fremont, CA (US); Saurabh Kataria, Webster, NY (US); Tong Sun, Penfield, NY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 1016 days.

(21) Appl. No.: 13/836,233

(22) Filed: Mar. 15, 2013

(65) Prior Publication Data
US 2014/0279618 A1 Sep. 18, 2014

(51) Int. Cl.
*G06Q 50/00* (2012.01)
*G06Q 30/00* (2012.01)

(52) U.S. Cl.
CPC .............. *G06Q 30/01* (2013.01); *G06Q 50/01* (2013.01)

(58) Field of Classification Search
CPC ............................... G06Q 30/01; G06Q 50/01
USPC .................................................. 705/304, 319
See application file for complete search history.

(56) References Cited

U.S. PATENT DOCUMENTS

| | | | |
|---|---|---|---|
| 8,635,281 B2 * | 1/2014 | Kelly | 709/205 |
| 2012/0209920 A1 * | 8/2012 | Neystadt et al. | 709/205 |
| 2013/0218882 A1 * | 8/2013 | McConnell | G06F 17/30433 707/728 |
| 2013/0282417 A1 * | 10/2013 | Gaedcke | G06Q 30/016 705/7.13 |

* cited by examiner

Primary Examiner — Lynda Jasmin
Assistant Examiner — Ehrin L Pratt

(57) ABSTRACT

A method, non-transitory computer readable medium, and apparatus for recommending a topic-cohesive and interactive implicit community are disclosed. For example, the method receives a request for customer care, selects an implicit community identified from a plurality of individual users of a social media website based upon a relevance score related to a topic of the request for customer care and recommends the implicit community in response to the request for customer care.

16 Claims, 6 Drawing Sheets

METHOD AND APPARATUS FOR RECOMMENDING TOPIC-COHESIVE AND INTERACTIVE IMPLICIT COMMUNITIES IN SOCIAL CUSTOMER RELATIONSHIP MANAGEMENT

The present disclosure relates generally to customer relationship management (CRM) using social media and, more particularly, to a method and an apparatus for recommending topic-cohesive and interactive implicit communities in social CRM.

BACKGROUND

Social media is broadening its reach to more than casual users. For example, social media is becoming used more for customer relationship management to address user comments and complaints. Popular social media service websites are attracting a growing number of online users to share information, their experiences or opinions with regard to a product or service they have purchased or used.

Extending the traditional call-center services, more and more product customer care agents use commercial social media listening and engagement tools to respond to users' complaints or issues and help the users to tackle their problems in order to improve the satisfaction of customers and product features.

However, current solutions search social media websites to individually look for complaints regarding a specific service or product. The social CRM services attempt to address these specific complaints one-by-one. In other words, social CRM is currently used only to address user complaints, but social CRM is not currently used to provide customer help for various issues.

SUMMARY

According to aspects illustrated herein, there are provided a method, a non-transitory computer readable medium, and an apparatus for recommending a topic-cohesive and interactive implicit community. One disclosed feature of the embodiments is a method that receives a request for customer care, selects an implicit community identified from a plurality of individual users of a social media website based upon a relevance score related to a topic of the request for customer care and recommends the implicit community in response to the request for customer care.

Another disclosed feature of the embodiments is a non-transitory computer-readable medium having stored thereon a plurality of instructions, the plurality of instructions including instructions which, when executed by a processor, cause the processor to perform a method that receives a request for customer care, selects an implicit community identified from a plurality of individual users of a social media website based upon a relevance score related to a topic of the request for customer care and recommends the implicit community in response to the request for customer care.

Another disclosed feature of the embodiments is an apparatus comprising a processor that is configured to receive a request for customer care, select an implicit community identified from a plurality of individual users of a social media website based upon a relevance score related to a topic of the request for customer care and recommend the implicit community in response to the request for customer care.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for recommending a topic-cohesive and interactive implicit community in social CRM. As discussed above, current social CRM solutions search social media websites to individually look for complaints regarding a specific service or product. The social CRM services attempt to address these specific complaints one-by-one. In other words, social CRM is currently used only to address user complaints, but social CRM is not currently used to provide customer help for various issues.

One embodiment of the present disclosure addresses the problems and improves the way social CRM is used. For example, the plurality of individual users on various social media websites can be formed into implicit communities that may become "experts" on various issues that can help resolve a customer issue. The communities may be considered to be "implicit" due to the fact that they are communities formed by analysis and associated together for the purpose of providing social CRM.

In other words, the communities identified by embodiments of the present disclosure do not exist explicitly. For example, there is no formal label such as "phone trouble shooting" forum where users share tips and post information in a formal matter. Rather, the implicit communities are formed based upon analysis of the interest and posted messages of the social media websites of the individual users, as will be discussed in further detail below.

In one embodiment, the present disclosure may be applied to other areas outside of social CRM as well. For example, the present disclosure may also be applied to any document-based community management scenario. For example, in academia, researchers often collaborate with each other to publish papers and hence form research communities that focus on certain research topics. The present disclosure would also be capable of recommending a list of cohesive implicit research communities to a researcher who is interested in some research topics.

Figure 1:
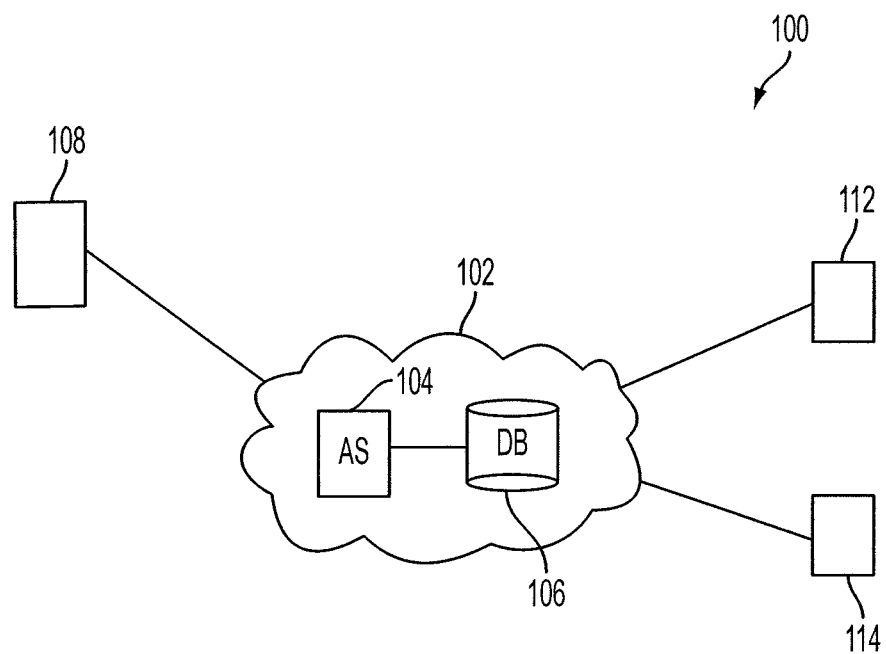
FIG. 1 illustrates one example of a communication network of the present disclosure.

To better understand the present disclosure, FIG. 1 illustrates an example of a communication network 100. In one embodiment, the communication network 100 includes a packet network such as an Internet Protocol (IP) network 102. The IP network 102 may be, for example, the Internet, a service provider network, an access network, a core network, a local area network, and the like.

In one embodiment, the IP network 102 may include an application server (AS) 104 and a database (DB) 106. In one embodiment, the AS 104 may host an application for creating implicit communities, analyzing the implicit communities to identify topics associated with each one of the implicit communities and recommending one of the implicit communities in response to a request for customer care. In one embodiment, the DB 106 may be used to store various information, such as for example, the implicit communities that are generated, the topics associated with the implicit communities, customer information for customers (or also referred to generally as "users") who request customer care (e.g., name, address, telephone number, which products the customer has requested customer care for, etc.), and the like. Although only a single AS 104 and a single DB 106 are illustrated in FIG. 1, it should be noted that any number of application servers and/or databases may be deployed.

Although the AS 104 and the DB 106 are illustrated as being in the IP network 102, it should be noted that the AS 104 and DB 106 could be located at a third party location outside of the IP network 102. For example, the AS 104 and DB 106 may be at an enterprise location that is in communication with the IP network 102.

In one embodiment, a social media website 108 may be in communication with the IP network 102. Although only one social media website 108 is illustrated in FIG. 1, it should be noted that any number of social media websites may be deployed for example two or more.

The social media website 108 may be a website, such as for example, Facebook® or Twitter® that each has a plurality of individual users. In other words, each user signs up for an account with one or more of the social media websites 108 and 110 on an individual basis and are not associated with any group or community. However, the social media websites 108 and 110 may have one or more follow activities that link one user to another. For example, on Facebook® the follow activity may be a friend request and on Twitter® the follow activity may be a follow command to follow messages (e.g., "tweets") that are posted by other users.

Typically, the social media websites 108 and 110 do not have any explicit communities. In other words, the social media websites 108 and 110 do not have specific groups with a specific discussion topic that a user can join to be a part of a specific discussion. Rather, users try to find other users that are known friends or seem to have a common interest and perform a follow activity (e.g., a friend request or a follow action) with those users.

In one embodiment, one or more endpoints 112 and 114 used by one or more users may be in communication with the IP network 102. In one embodiment, the end point device 108 may be any device capable of communicating with the IP network 102. For example, the end point device 108 may be a desktop computer, a laptop computer, a mobile endpoint device, a smart phone, a tablet computer, a netbook computer, and the like. In one embodiment, the users associated with the one or more endpoints 112 and 114 may or may not also be subscribed to one or more of the social media websites 108 and 110.

Figure 2:
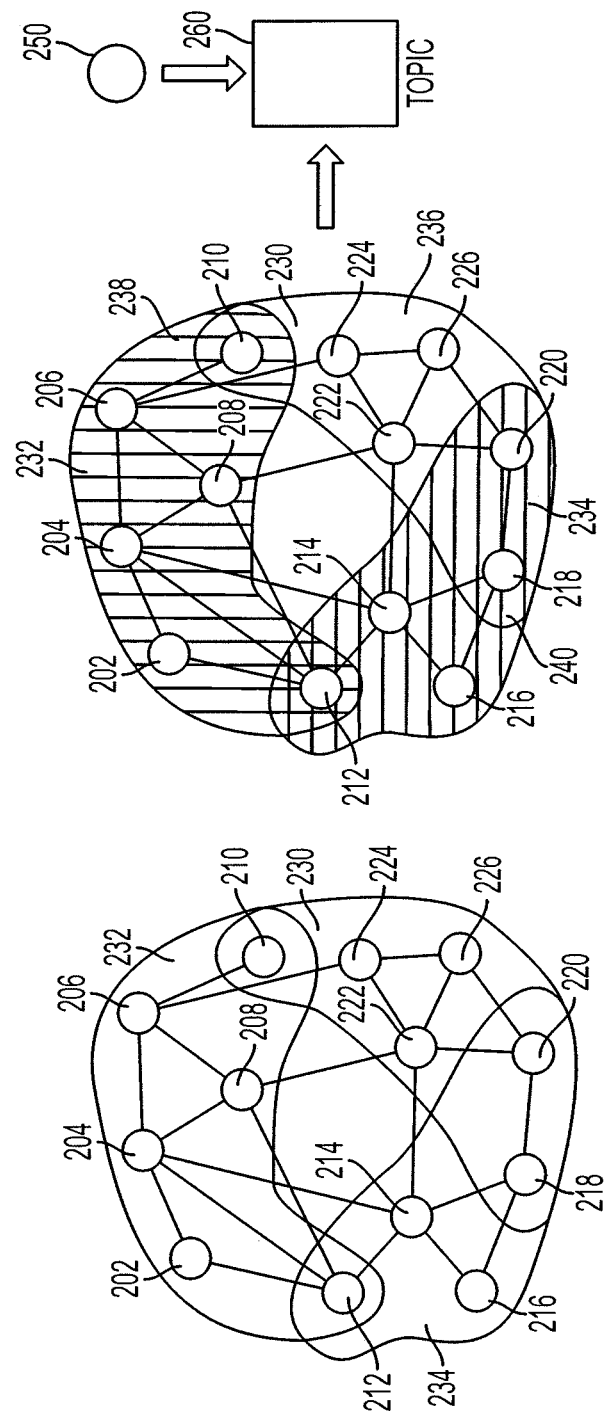
FIG. 2 illustrates an example graphical representation of identifiying implicit communities and identifying community-user topic models.

FIG. 2 illustrates an example graphical representation of identifying implicit communities and identifying community-user topic models. For example, a plurality of users 202-226 may be subscribed to a social media website (e.g., social media website 108). Each one of the plurality of users 202-226 may be linked to one or more other users via a follow activity as illustrated by the lines connecting two users.

In one embodiment, one or more subset of the plurality of users 202-226 may be grouped together to create or identify one or more implicit communities 230, 232 and 234. In one embodiment, some of the users, e.g., users 210, 212, 218 and 220 may be part of more than one implicit community. It should be noted that although 13 users are illustrated in FIG. 2, any number of users (more or less) may be available. Although the users 202-226 are grouped into three implicit communities as an example, it should be noted that the users 202 and 226 may be grouped into any number (more or less) of implicit communities.

As discussed above, the communities may be considered to be "implicit" due to the fact that they are communities formed by analysis and associated together for the purpose of providing social CRM. In other words, the implicit communities 230, 232 and 234 do not actually exist within the context of the social media website. Rather, the implicit communities 230, 232 and 234 are users that are grouped together by a social CRM service provider based upon analysis of the follow activity of each one of the users 202-226. In other words, the users 202-206 may not even be aware that they are part of any implicit community as designated by a social CRM service provider.

After the one or more implicit communities 230, 232 and 234 are identified, one or more topics may be identified that are associated with each one of the implicit communities 230, 232 and 234. For example, the implicit community 230 may be associated with a topic 236, the implicit community 232 may be associated with a topic 238 and the implicit community 234 may be associated with a topic 240. It should be noted that only one topic is illustrated as being associated with each implicit community. However, each implicit community may be associated with a plurality of topics depending on the documents or messages that are posted by each one of the users within the implicit community.

In addition, each one of the users 202-226 may be associated with one or more topics. Some of the users, e.g., 210, 212, 218 and 220, may be associated with multiple topics. In one embodiment, the one or more topics 236, 238 and 240 associated with the implicit communities 230, 232 and 234 and the users 202-226 may be used to recommend one of the implicit communities 230, 232 and 234 or a user 202-226 in response to a customer care request.

For example, a user 250 may submit a customer care request 260 associated with a particular topic. For example, the user 250 may submit the request 260 via his or her endpoint device 112. The request may include a help topic of a particular cell phone model. In one embodiment, based upon a relevance score of the topics 236, 238 and 240 discussed in the implicit communities 230, 232 and 234, respectively or by the one or more users 202-226, a social CRM service provider may recommend one of the implicit communities 230, 232 or 234 or one of the users 202-226 to address the request of the user 250.

As a result, social CRM services may leverage the knowledge that already exists and is available on the social media websites instead of having to hire additional employees to provide technical support. As a result, costs savings and higher customer satisfaction may be achieved.

Figure 3:
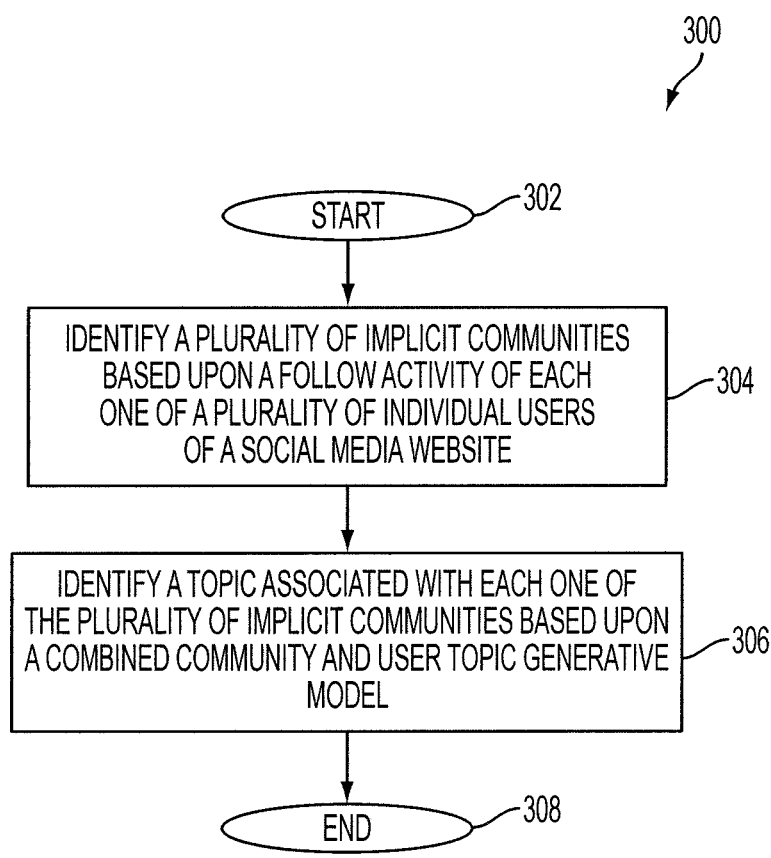
FIG. 3 illustrates an example flowchart of one embodiment of a method for creating a plurality of implicit communities.
Figure 6:
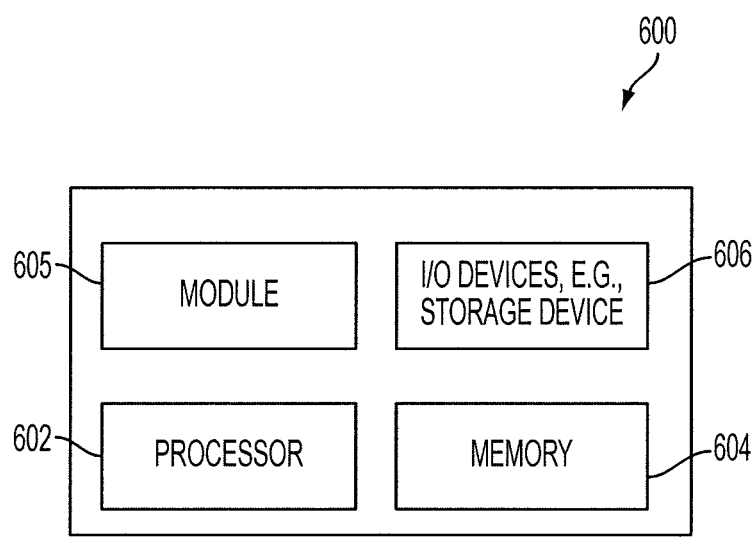
FIG. 6 illustrates a high-level block diagram of a general-purpose computer suitable for use in performing the functions described herein.

FIG. 3 illustrates a flowchart of a method 300 for creating a plurality of implicit communities. In one embodiment, the method 300 may be performed by the AS 104 or a general-purpose computer as illustrated in FIG. 6 and discussed below.

The method 300 begins at step 302. At step 302, the method 300 may identify a plurality of implicit communities based upon a follow activity of each one of a plurality of individual users of a social media website. FIG. 2 illustrates an example graphical interpretation of the identified implicit communities.

In one embodiment, the plurality of implicit communities may be identified by using a graph analysis on a friendship or follow graph (e.g., as illustrated in FIG. 2) generated through the collection of the follow activities of the users of the social media website. In one embodiment, a soft clustering technique may be used based on an observation that a user might belong to several implicit communities in practice.

One example of a soft clustering algorithm may use a bipartite graph to encode the conditional probability of transitions between nodes, i.e., the probability of a data object belonging to a cluster. In one embodiment, a bipartite graph is a graph whose vertices can be divided into two disjoint sets such that every edge connects a vertex in one set to a vertex in another set. Formally, let K(V,U,F) be a bipartite graph, where $V=\{v_i\}_{i=1}^{n}$, contains all the data objects, $U=\{u_p\}_{p=1}^{m}$ contains all the clusters, and F contains all the conditional probabilities that $v_i$ belongs to $u_p$. Let $B=\{b_{ip}\}$ denote the n×m adjacency matrix with $b_{ip} \geq 0$ being the weight for edge [vi, up]. The bipartite graph K induces a similarity between data objects vi and vj by $$w_{ij} = \sum_{p=1}^{m} \frac{b_{ip} b_{jp}}{\lambda_p} \qquad \text{Eq. (1)}$$
$$= (B\Lambda^{-1}B^T)_{ij},$$
$$\Lambda = \text{diag}(\lambda_1, \ldots, \lambda_m),$$

where $\lambda_p = \sum_{i=1}^{n} b_{ip}$ denotes the degree of vertex $u_p \in U$. Without loss of generality, we normalize W to ensure $\Sigma_{ij} w_{ij} = 1$. Our goal is to construct such a bipartite graph to approximate the original data similarity graph. To obtain such approximation, we need to minimize $d(W, B\Lambda^{-1}B^T)$, given a distance measurement $d(\cdot,\cdot)$ between two adjacency matrices. To simplify the problem, we decouple B and $\Lambda$ via $H=B\Lambda^{-1}$, and consequently have $$\min_{H,\Lambda} d(W, H\Lambda H^T), \qquad \text{Eq. (2)}$$
$$\text{s.t.} \sum_{i=1}^{n} h_{ip} = 1, H \in R_+^{n \times m},$$
$$\Lambda \in D_+^{m \times m},$$

where $D_+^{m \times m}$ denotes the set of m×m diagonal matrices with positive diagonal entries. This problem is a symmetric variant of non-negative matrix factorization.

At step 306, the method 300 identifies one or more topics associated with each one of the plurality of implicit communities based upon a combined community and user topic generative model. Topic modeling is a type of statistical model for discovering the latent "topics" that occur in a collection of documents (e.g., posts or messages by a user in the social media websites). One type of topic modeling that may be used may be Latent Dirichlet Allocation (LDA).

LDA is an example of a topic model and was first presented as a graphical model for topic discovery. LDA is a generative model that allows sets of observations (documents, messages, posts) to be explained by unobserved groups (topics) that explain why some parts of the data are similar. In LDA, each document may be viewed as a mixture of various topics, and each topic is characterized by a distribution over words, with the assumption that such mixture or topic distribution has a Dirichlet prior. Using such a generative process, the latent topics contained in a collection of documents can be well captured.

Figure 5:
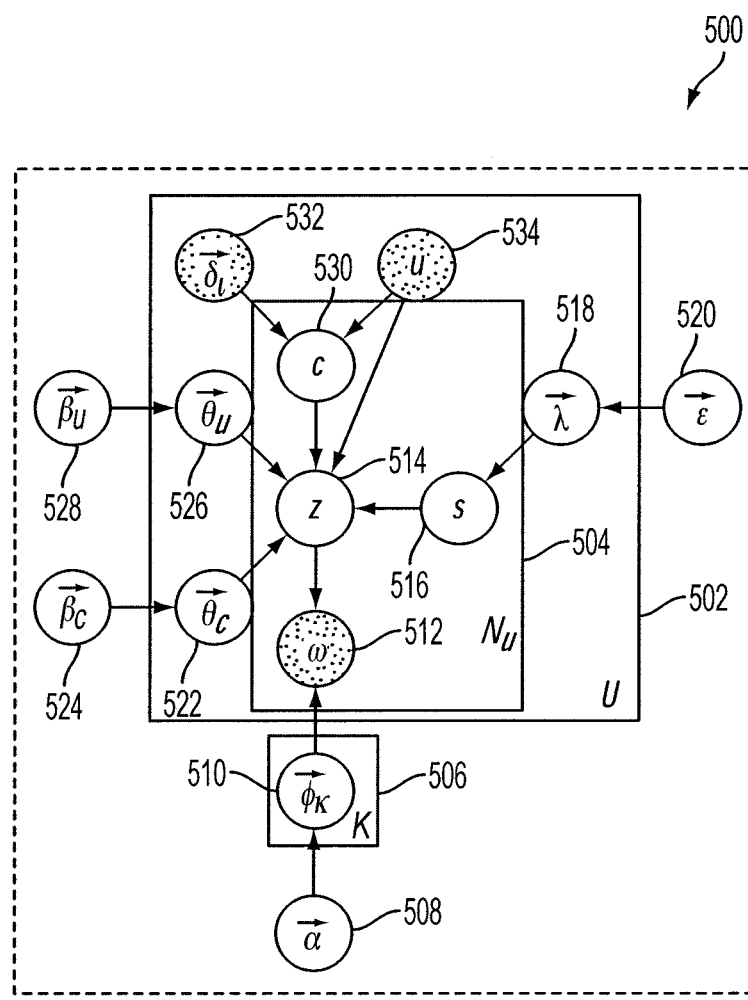
FIG. 5 illustrates one example of a user and community-topic model.

In one embodiment, a novel topic model is presented, in which each word is generated via a mixture of topics, where a topic can either be generated according to users' interest, or from a community's interest. An illustration of this model is illustrated in FIG. 5. The notations for all the variables in the model 500 illustrated in FIG. 5 are listed in Table 1 below.

TABLE 1

DEFINITION OF VARIABLES

| | Descriptions |
|---|---|
| U | The user set in the community data. |
| V | The dictionary of texts in the community data. |
| L | The number of communities predefined. |
| $N_u$ | The term set of texts posted by user u. |
| $\vec{\alpha}$ | Dirichlet prior hyperparameter (known) on the term distribution. |
| $\vec{\beta}$ | Dirichlet prior hyperparameter (known) on the mixture topic distribution. |
| $\vec{\gamma}$ | Prior hyperparameter (known) on the mixture community distribution. |
| $\vec{\epsilon}$ | Prior hyperparameter on the binary mixture. |
| $\vec{\phi}_k$ | p(t|z = k), the mixture component of topic k. |
| $\vec{\theta}_m$ | p(z|u = m), the topic mixture proportion for user m. |
| $\vec{\delta}_l$ | p(u|c = l), the user proportion for community l. (observed) |
| $\vec{\lambda}$ | Binary mixture for word generation. |
| c | The community mixture. |
| u | Mixture indicator that chooses a user from a community |
| z | Mixture indicator that chooses the topic for the term from a user. |
| w | Term indicator for the word from a user. |
| s | Binary factor for word generation. |

FIG. 5 illustrates an example of a user and community-topic model 500 that considers a user-topic and a community-topic simultaneously. In other words, the model illustrates a topic model based upon a combined community and user topic generative model. The model 500 graphically illustrates the probabilistic dependencies of the variables denoted by nodes 508-534. Said another way, the model 500 graphically illustrates the assumptions of how interactions are occurring between nodes 508-534 within the implicit communities identified in step 304. The plates 502, 504 and 506 group certain portions of the model 500 to represent all the variables related to a corresponding object. For example, the box 502 includes all of the variables related to the user set U. The box 504 a represents all of the variables related to the number of topics of the users in the implicit community $N_u$. The box 506 represents all of the variables related to each of the topics K discussed in the social media website.

Given the model 500 and the assumptions associated with the model 500, a generative process may be created for the model 500. In one embodiment, an algorithm 1 is provided below that provides one way to implement a Gibbs sampling method giving the model 500 and to measure the assumptions of variables used in the model 500. In one embodiment, the algorithm 1 may be represented as follows:

---
ALGORITHM 1:
---
for each topic z ∈ (1,...,K) do
  Sample $\phi_k \sim \text{Dir}(\cdot | \vec{\alpha})$
end for
for each user u ∈ (1,...,U) do
  Sample $\lambda_u \sim \text{Beta}(\cdot | \vec{\epsilon})$
  for each word w ∈ (1,...,$N_u$) do
    Sample $s \sim \text{Bern}(\cdot | \vec{\lambda}_u)$
    Choose a community assignment $c_u \sim \text{Mult}(\cdot | \vec{\delta}_l)$
    if(s==0): then
      Choose a topic assignment $z \sim \text{Mult}(\cdot | \vec{\theta}_u)$
    else
      Choose a topic assignment $z \sim \text{Mult}(\cdot | \vec{\theta}_c)$
    end if
    Choose a term $w \sim \text{Mult}(\cdot | \vec{\phi}_k, z)$
  end for
end for
---

According to the graphical representation of the user-community topic model 500, the joint probability of the latent and observed variables can be factorized as follows:

$$p(w,z,u,c,s,\phi_k,\theta_u,\theta_c,\delta_l,\lambda | \vec{\alpha}, \vec{\beta}_c, \vec{\beta}_u,$$
$$\vec{\epsilon}) = p(w|z,\phi_k)p(z|u,c,s,\theta_u,\theta_c)p(c|u,\delta_l)p(s|\lambda)p(\lambda|$$
$$\vec{\epsilon})p(\phi_k|\vec{\alpha})p(\theta_u|\vec{\beta}_u)p(\theta_c|$$
$$\vec{\beta}_c)p(z|u,c,s,\theta_u,\theta_c) = p(z|u,s=0,\theta_u) \cdot p(z|c,s=1,\theta_c) \quad \text{Eq. (3):}$$

Note that the posterior probability of topics given other variables depends on the value of the Bernoulli variables s. If s==0, the optic assignment for a specific word w will be sampled from the multinomial distribution of $\theta_u$, with respect to a user u; if s==1, the topic assignment for the word w will be sampled from the multinomial distribution of $\theta_c$, with respect to an implicit community c.

In one embodiment, Gibbs sampling may be used to approximate the joint distribution of multiple variables by drawing a sequence of samples. Gibbs sampling is a Markov chain Monte Carlo algorithm and usually applies when the conditional probability distribution of each variable can be evaluated. Rather than explicitly parameterizing the distributions for variables, Gibbs sampling integrates out the parameters and estimates the corresponding posterior probability.

In Gibbs sampling, a Markov chain is formed, the transition between successive states of which is simulated by repeatedly drawing a topic for each observed word from its conditional probability on all other variables. Particularly in the model 500, $\lambda$ of the Bernoulli distribution $\text{Bern}(\cdot|\lambda), \theta_u$, and $\theta_c$ of the multinomial distributions $\text{Multi}(\cdot|\theta_u)$ and $\text{Multi}(\cdot|\theta_c)$, respectively, can be estimated. To generalize the notations, let $s_{-i}$ to be all other assignments of the binary factor s excluding the current instance, and $z_{-i}$ to be all other assignments of topic excluding the current instance. According to the joint probability distribution of the latent and the observed variables discussed above, we have the following updates:

$$p(s_i = 0 | s_{-i}, w_i, z_i, u_i, c_i) \quad \text{Eqs. (4)-(7)}$$
$$p(s_i = 1 | s_{-i}, w_i, z_i, u_i, c_i)$$
$$p(z_i | z_{-i}, w_i, s_i = 0, u_i, c_i)$$
$$p(z_i | z_{-i}, w_i, s_i = 1, u_i, c_i)$$

The derivation of these updates are as follows (the notations within the updates below are listed in Table 2 below):

$$p(s_i = 1 | s_{-i}, w_i, z_i, u_i, c_i) \propto \frac{p(s_i = 1, s_{-i}, w_i, z_i, u_i, c_i)}{p(s_{-i}, w_i, z_i, u_i, c_i)} \propto \quad \text{Eq. (8)}$$
$$p(s_i = 1 | z_i, u_i, c_i) = p(z_i | s_i = 1, c_i) \cdot p(s_i = 1 | u_i) \propto$$
$$\frac{n_{z_i,c_i,s_i=1} + \beta_c(z_i)}{\sum_{z_i} n_{z_i,c_i,s_i=1} + \sum_{z_i} \beta_c(z_i) - 1} \cdot \frac{n_{s_i=1,u_i=u+\epsilon_{s=1}}}{\sum_{s_i} n_{s_i=1,u_i=u+\epsilon_{s=0}+\epsilon_{s=1}} - 1}.$$

$$p(s_i = 0 | s_{-i}, w_i, z_i, u_i, c_i) \propto \frac{p(s_i = 0, s_{-i}, w_i, z_i, u_i, c_i)}{p(s_{-i}, w_i, z_i, u_i, c_i)} \propto \quad \text{Eq. (9)}$$
$$p(s_i = 0 | z_i, u_i) = p(z_i | s_i = 0, u_i) \cdot p(s_i = 0 | u_i) \propto$$
$$\frac{n_{z_i,u_i,s_i=0} + \beta_u(z_i)}{\sum_{z_i} n_{z_i,u_i,s_i=0} + \sum_{z_i} \beta_u(z_i) - 1} \cdot \frac{n_{s_i=0,u_i=u+\epsilon_{s=0}}}{\sum_{s_i} n_{s_i=0,u_i=u+\epsilon_{s=0}+\epsilon_{s=1}} - 1}.$$

$$p(z_i | z_{-i}, w_i, s_i = 0, u_i, c_i) \propto \frac{p(z_i, w_i, s_i = 0, u_i, c_i)}{p(z_{-i}, w_i, s_i, = 0, u_i, c_i)} \propto \quad \text{Eq. (10)}$$
$$p(z_i, s_i = 0, w_i, u_i, c_i) = p(w_i | z_i) \cdot p(z_i | s_i = 0, u_i) \propto$$
$$\frac{n_{w_i,z_i} + \alpha(w_i)}{\sum_v n_{w_i,z_i} + \sum_v \alpha(w_i) - 1} \cdot \frac{n_{z_i,u_i,s_i=0} + \beta_u(z_i)}{\sum_{z_i} n_{z_i,u_i,s_i=0} + \sum_{z_i} \beta_u(z_i) - 1}.$$

$$p(z_i | z_{-i}, w_i, s_i, = 1, u_i, c_i) \propto \frac{p(z_i, w_i, s_i = 1, u_i, c_i)}{p(z_{-i}, w_i, s_i, = 1, u_i, c_i)} \propto \quad \text{Eq. (11)}$$
$$p(z_i, s_i = 1, w_i, u_i, c_i) = p(w_i | z_i) \cdot p(z_i | s_i = 1, c_i) \propto$$
$$\frac{n_{w_i,z_i} + \alpha(w_i)}{\sum_v n_{w_i,z_i} + \sum_v \alpha(w_i) - 1} \cdot \frac{n_{z_i,c_i,s_i=1} + \beta_c(z_i)}{\sum_{z_i} n_{z_i,c_i,s_i=1} + \sum_{z_i} \beta_c(z_i) - 1}.$$

TABLE 2

DEFINITION OF VARIABLES IN UPDATE EQUATIONS

| Notations | Descriptions |
|---|---|
| $n_{z_i, c_i, s_i=1}$ | # of times that $z_i$ is assigned to $c_i$ with $s_i = 1$ for word $w_i$. |
| $n_{z_i, c_i, s_i=0}$ | # of times that $z_i$ is assigned to $c_i$ with $s_i = 0$ for word $w_i$. |
| $n_{s_i=1, u_i=u}$ | # of times that $s_i = 1$ is assigned to $u_i$. |
| $n_{s_i=0, u_i=u}$ | # of times that $s_i = 0$ is assigned to $u_i$. |
| $n_{w_i, z_i}$ | # of times that $w_i$ is assigned to $z_i$. |
| $n(z_i, u_i, s_i = 0)$ | # of times that $z_i$ is assigned to $u_i$ with $s_i = 0$ for word $w_i$. |

Thus, the method 300 identifies a plurality of implicit communities that are also interactive. In other words, the implicit communities help to ensure or make it more likely than not that a user will respond to a customer care request due to the fact that the implicit communities are identified based on follow activities and an influence factor. For example, if the customer who submits the customer care request is also a subscriber to the social media website that is being analyzed to identify the implicit communities, the customer's own links or number of interactions (e.g., reply activity, re-tweeting activity, and the like) to other users may be considered. For example, an implicit community that includes some of the "friends" of the customer may be more likely to be interactive than another implicit community in which the customer has no association to any of the users. The method 300 ends at step 308.

Figure 4:
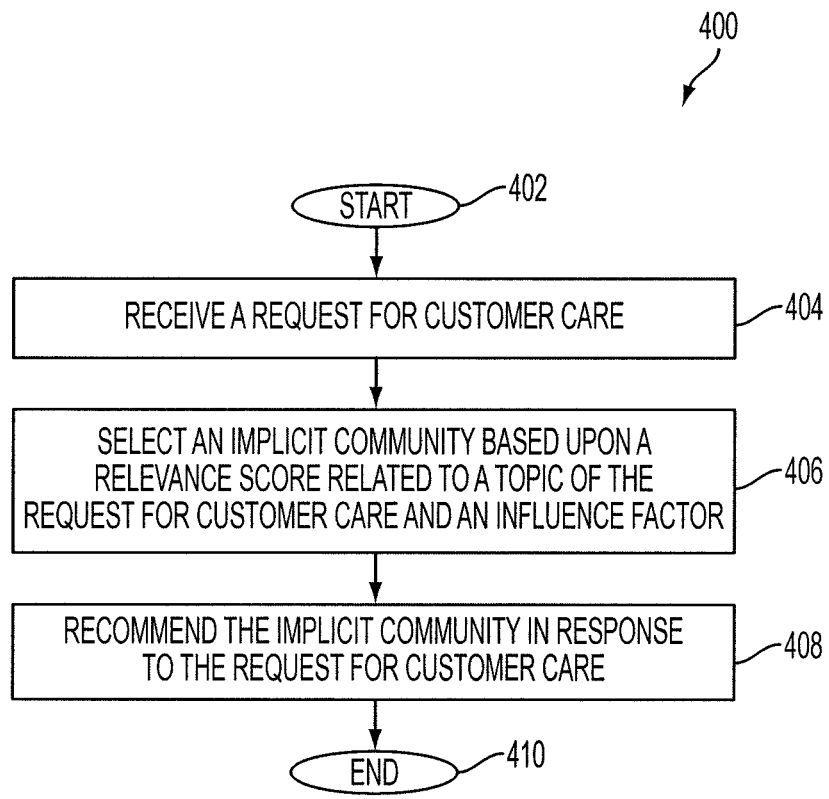
FIG. 4 illustrates an example flowchart for one embodiment of a method for recommending a topic-cohesive and interactive implicit community.

FIG. 4 illustrates a flowchart of a method 400 for recommending a topic-cohesive and interactive implicit community. In one embodiment, the method 400 may be performed by the AS 104 or a general-purpose computer as illustrated in FIG. 6 and discussed below. Once the plurality of implicit communities are identified and a topic is identified for each one of the plurality of communities and users as described in the method 300, an implicit community or a user can be recommended in response to a customer care request by a social CRM service provider or company.

The method 400 starts at step 402. At step 404, the method 400 receives a request for customer care. For example, a customer of a particular company that provides a product or service may have a question regarding the product or service. In the past, the company may be required to hire employees to provide live technical support. However, many individuals may experience the same problems and have posted knowledge, solutions or work-arounds to various technical problems or service issues on the social media websites. In one embodiment, the embodiments of the present disclosure may be used to leverage the available information that exists in the social media websites to recommend a user or an implicit community in response to the request for customer care.

In one embodiment, the request may be received via a web interface on the endpoint of the customer or user. For example, the company or a social CRM service provider may host a website on an application server that displays a web interface to the user. The web interface may include areas where the customer may provide contact information, a specific topic, word or issue related to the customer care requested, and the like.

In another embodiment, the customer care request may be received by detecting a posting, tweet or message on a social media website. For example, the customer may simply post the customer care request on a social media website that is monitored by the social CRM service provider or company.

At step 406, the method 400 selects an implicit community based upon a relevance score related to a topic of the request for customer care and an influence factor. In one embodiment, the implicit community may include one or more of the plurality of individual users that are subscribed to the social media website. Thus, the implicit community may be a user if the implicit community only includes a single user.

In one embodiment, the inferred probabilistic relations from the model 500 provide a basis for a community recommendation or a user recommendation when the community only includes a single user. Given a set of keywords $W=\{w_1, \ldots, w_k\}$ described by a user (e.g., the topic, words or issues included in the customer care request), a list of users or a list of implicit communities relevant to W can be recommended. For this purpose, a relevance score that describes how relevant a community (or a user) is with respect to the given term set W can be defined. In one embodiment, two relevance computations can be described as follows:

Given a community c, the relevance score between c and W can be calculated as $$p(c \mid W) = \frac{\sum_z p(cWz)}{p(W)} \propto \sum_z \left( p(z \mid c) p(c) \prod_{w_i} p(w_i \mid z) \right) \propto$$

Eq. (13)

$$p(c) \sum_z p(c) \sum_z \left( p(z \mid c) \prod_{w_i} p(w_i \mid z) \right)$$

In the above Equation (13), p(c) denotes the basic community distribution obtained from the module of community detection. The term p(z|c) represents the probability of a topic z given the community c, and $p(w_i|z)$ is the probability of a word $w_i$ given a topic z. Both p(z|c) and $p(w_i|z)$ are obtained from the module of topic modeling. The implicit communities can then be ranked based on this relevance score and the top ranked implicit community or implicit communities can be selected for recommendation.

In one embodiment, a list of representative customers can also be recommended in response to the customer care request based upon a relevance score using the following equation:

Given a user u, the relevance score between u and W can be calculated as:

$$p(u \mid W) = \frac{\sum_z p(uWz)}{p(W)} \propto \sum_z \left( p(z \mid u) p(u) \prod_{w_i} p(w_i \mid z) \right) \propto$$

Eq. (14)

$$p(u) \sum_z p(u) \sum_z \left( p(z \mid u) \prod_{w_i} p(w_i \mid z) \right)$$

In the above Equation (14), p(z|u) represents the probability of a topic z given the user u. The term $p(w_i|z)$ is the probability of a word $w_i$ given a topic z. Both p(z|u) and $p(w_i|z)$ are obtained from the module of topic modeling. The users may then be ranked based on the relevance score and the top ranked user or users may be selected for recommendation.

In one embodiment, the recommended implicit communities are topic relevant, since in the recommendation process the relations between the given term and the communities are considered. The recommended implicit communities are also topic cohesive, since user-related topics and community-related topics are distinguished in the topic modeling process. In this way, the engagement of the customer submitting the customer care request would be extensively enriched if he or she joins the recommended implicit communities that are relevant to his or her interest. In addition, the interactions within the implicit community will become more intense due to the involvement of a customer interested in topics that the implicit community often discusses.

Furthermore, an influence factor may be calculated based upon a function of the intensity of the interactions between users within each implicit community that can be measured by leveraging the interactions between users (e.g., replying and/or re-tweeting activities data) in the social media websites. The influence factor may be considered as another important factor for ranking the implicit communities and making a recommendation. For example, an implicit community that includes some of the "friends" of the customer, which the customer may have a high influence over or vice versa, may be more likely to be interactive than another implicit community in which the customer has no association or no influence to any of the users.

At step 408, the method 400 recommends the implicit community in response to the request for customer care. For example, using the web interface, the implicit community that is selected based upon the relevance score calculation may be provided to the user. In another embodiment, the social CRM service provider or the company may simply make the recommendation by replying on the social media website on which the customer care request was posted. The recommendation may also include additional information, such as for example, the social media website for the implicit community, one or more users within the implicit community, the relevance score for each one of the recommended implicit communities or users if more than one implicit community or user is recommended, and the like. In one embodiment, the relevance score may be converted into a percentage to allow the customer to easily understand how "close" the topics associated with the recommended implicit communities or users are to the topic, keywords, or issues included in the customer care request. The method 400 ends at step 410.

It should be noted that although not explicitly specified, one or more steps, functions, or operations of the methods 300 and 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIGS. 3 and 4 that recite a determining operation, or involve a decision, do not necessarily require that both branches of the determining operation be practiced. In other words, one of the branches of the determining operation can be deemed as an optional step.

FIG. 6 depicts a high-level block diagram of a general-purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for creating a plurality of implicit communities or recommending a topic-cohesive and interactive implicit community, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 605 for creating a plurality of implicit communities or recommending a topic-cohesive and interactive implicit community can be loaded into memory 604 and executed by processor 602 to implement the functions as discussed above. As such, the present method 605 for creating a plurality of implicit communities or recommending a topic-cohesive and interactive implicit community (including associated data structures) of the present disclosure can be stored on a non-transitory (e.g., physical and tangible) computer readable storage medium, e.g., RAM memory, magnetic or optical drive or diskette and the like. For example, the hardware processor 602 can be programmed or configured with instructions (e.g., computer readable instructions) to perform the steps, functions, or operations of methods 300 and 400.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for posting a reply that includes a recommended topic-cohesive and interactive implicit community on a social media website, comprising:

generating, by a processor, a plurality of implicit communities using a bipartite graph K(V,U,F) of a soft clustering algorithm, where $V=\{v_i\}_{i=1}^{n}$ contains all the data objects, $U=\{u_p\}_{p=1}^{m}$ contains all the clusters, and F contains all the conditional probabilities that $v_i$ belongs to $u_p$;

identifying, by the processor, one or more topics associated with each one of the plurality of implicit communities, wherein each one of the plurality of implicit communities is identified from a plurality of individual users of a plurality of different social media websites accessed via the Internet;

receiving, by the processor, a request for customer care at a customer relationship management service provider, wherein the request is received by detecting a message on the social media website;

calculating, by the processor, a relevance score as a function of a topic associated with the request for customer care for each one of the plurality of implicit communities based upon a respective topic of the one or more topics associated with each one of the plurality of implicit communities identified using a combined community and user topic generative model, wherein the combined community and user topic generative model selects a word for the one or more topics used to calculate the relevance score by implementing a Gibbs sampling method on the combined community and user topic generative model that comprises probabilistic dependencies of all variables related to the one or more topics in an implicit community set inside of all variables related to a user set and all variables related to each topic discussed in the social media website;

calculating, by the processor, an influence factor for each one of the plurality of implicit communities, wherein the influence factor is a function of a number of interactions of a customer with each member of a respective one of the plurality of implicit communities and a friend of the customer in one or more of the plurality of different social media websites;

selecting, by the processor, an implicit community of the plurality of implicit communities based upon the relevance score and the influence factor, wherein the implicit community includes the friend of the customer in the one or more of the plurality of different social media websites; and posting, by the processor, a reply to the request for customer care on the social media website that the request was detected to help resolve a customer issue, wherein the reply includes the implicit community that is selected.

2. The method of claim 1, wherein the implicit community is identified based upon a follow activity of each one of the plurality of individual users.

3. The method of claim 2, wherein the implicit community is generated using a probability graph analysis.

4. The method of claim 1, further comprising:
identifying a topic associated with each one of the plurality of implicit communities based upon a combined community and user topic generative model.

5. The method of claim 1, wherein the plurality of implicit communities is identified before the request for customer care is received.

6. The method of claim 1, wherein the implicit community comprises a single user or a plurality of users.

7. The method of claim 1, wherein the implicit community having a highest relevance score relative to a calculated relevance score of each one of a plurality of implicit communities is identified.

8. A non-transitory computer-readable medium storing a plurality of instructions, which when executed by a processor, cause the processor to perform operations for posting a reply that includes a recommended topic-cohesive and interactive implicit community on a social media website, the operations comprising:
generating a plurality of implicit communities using a bipartite graph K(V,U,F) of a soft clustering algorithm, where $V=\{v_i\}_{i=1}^{n}$ contains all the data objects, $U=\{u_p\}_{p=1}^{m}$ contains all the clusters, and F contains all the conditional probabilities that $v_i$ belongs to $u_p$;
identifying one or more topics associated with each one of the plurality of implicit communities, wherein each one of the plurality of implicit communities is identified from a plurality of individual users of a plurality of different social media websites accessed via the Internet;
receiving a request for customer care at a customer relationship management service provider, wherein the request is received by detecting a message on the social media website;
calculating a relevance score as a function of a topic associated with the request for customer care for each one of the plurality of implicit communities based upon a respective topic of the one or more topics associated with each one of the plurality of implicit communities identified using a combined community and user topic generative model, wherein the combined community and user topic generative model selects a word for the one or more topics used to calculate the relevance score by implementing a Gibbs sampling method on the combined community and user topic generative model that comprises probabilistic dependencies of all variables related to the one or more topics in an implicit community set inside of all variables related to a user set and all variables related to each topic discussed in the social media website;
calculating an influence factor for each one of the plurality of implicit communities, wherein the influence factor is a function of a number of interactions of the customer with each member of a respective one of the plurality of implicit communities and a friend of the customer in one or more of the plurality of different social media websites;
selecting an implicit community of the plurality of implicit communities based upon the relevance score and the influence factor, wherein the implicit community includes the friend of the customer in the one or more of the plurality of different social media websites; and
posting a reply to the request for customer care on the social media website that the request was detected to help resolve a customer issue, wherein the reply includes the implicit community that is selected.

9. The non-transitory computer-readable medium of claim 8, wherein the implicit community is identified based upon a follow activity of each one of the plurality of individual users.

10. The non-transitory computer-readable medium of claim 9, wherein the implicit community is generated using a probability graph analysis.

11. The non-transitory computer-readable medium of claim 8, further comprising:
identifying a topic associated with each one of the plurality of implicit communities based upon a combined community and user topic generative model.

12. The non-transitory computer-readable medium of claim 8, wherein the plurality of implicit communities is identified before the request for customer care is received.

13. The non-transitory computer-readable medium of claim 8, wherein the implicit community comprises a single user or a plurality of users.

14. The non-transitory computer-readable medium of claim 8, wherein the implicit community having a highest relevance score relative to a calculated relevance score of each one of a plurality of implicit communities is identified.

15. A method for posting a reply that includes a recommended topic-cohesive and interactive implicit community on a social media website, comprising:
generating, by a processor, a plurality of implicit communities using a bipartite graph K(V,U,F) of a soft clustering algorithm, where $V=\{v_i\}_{i=1}^{n}$ contains all the data objects, $U=\{u_p\}_{p=1}^{m}$ contains all the clusters, and F contains all the conditional probabilities that $v_i$ belongs to $u_p$;
identifying, by the processor, one or more topics associated with each one of the plurality of implicit communities, wherein each one of the plurality of implicit communities is identified from a plurality of individual users of a plurality of different social media websites accessed via the Internet;
receiving, by the processor, a request for customer care from a customer at a customer relationship management service provider, wherein the request comprises a problem topic, wherein the request is received by detecting a message on the social media website;
calculating, by the processor, a relevance score as a function of the problem topic for each one of a plurality of implicit communities identified from a plurality of individual users of a social media website based upon a respective topic of the one or more topics associated with each one of the plurality of implicit communities identified using a combined community and user topic generative model, wherein the combined community and user topic generative model selects a word for the one or more topics used to calculate the relevance score by implementing a Gibbs sampling method on the combined community and user topic generative model that comprises probabilistic dependencies of all variables related to the one or more topics in an implicit community set inside of all variables related to a user set and all variables related to each topic discussed in the social media website;
calculating, by the processor, an influence factor for each one of the plurality of implicit communities, wherein the influence factor is a function of a number of interactions of the customer with each member of a respective one of the plurality of implicit communities and a friend of the customer in one or more of the plurality of different social media websites;

selecting, by the processor, a implicit community from the plurality of implicit communities having a highest relevance score and a highest influence factor, wherein the implicit community includes the friend of the customer in the one or more of the plurality of different social media websites; and posting, by the processor, a reply to the request for customer care on the social media website that the request was detected to help resolve a customer issue, wherein the reply includes the implicit community that is selected for the customer.

16. The method of claim 15, wherein the plurality of implicit communities is identified before the request for customer care is received based upon a follow activity of each one of the plurality of individual users.

* * * * *